US006693885B1

(12) United States Patent
Sydon et al.

(10) Patent No.: US 6,693,885 B1
(45) Date of Patent: Feb. 17, 2004

(54) METHOD, MOBILE STATION AND BASE STATION FOR TRANSMITTING SIGNALS

(75) Inventors: Uwe Sydon, Duesseldorf (DE); Juergen Kockmann, Gronau-EPE (DE); Hermann-Josef Terglane, Heek (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/446,654

(22) PCT Filed: Aug. 14, 1997

(86) PCT No.: PCT/DE97/01739

§ 371 (c)(1),
(2), (4) Date: Mar. 24, 2000

(87) PCT Pub. No.: WO98/59438

PCT Pub. Date: Dec. 30, 1998

(30) Foreign Application Priority Data

Jun. 24, 1997 (WO) ............................. PCT/DE97/01315

(51) Int. Cl.$^7$ ............................. H04B 7/212; H04J 3/00
(52) U.S. Cl. ................. 370/337; 370/347; 370/442; 370/468
(58) Field of Search ................. 370/328–330, 370/336–337, 345, 347, 458, 459, 465, 468, 442; 375/132, 131, 133–137

(56) References Cited

U.S. PATENT DOCUMENTS 5,729,543 A * 3/1998 Weigand et al. ............ 370/347
5,805,633 A * 9/1998 Uddenfeldt ................. 375/133
6,061,409 A * 5/2000 Moriya ....................... 375/357
6,298,225 B1 * 10/2001 Tat et al. ..................... 455/220

FOREIGN PATENT DOCUMENTS

EP 0 767 551 4/1997
GB 2 295 930 6/1996

OTHER PUBLICATIONS

Phillip D. Rasky et al., "Slow Frequency–Hop TDMA/CDMA for Macrocellular Personal Communications", IEEE Personal Communications vol. 1, No. 2, (1994), pp. 26–35.
DECT/GAP standard (Digital European Cordless Telecommunication; cf. (1): Nachrichtentechnik Elektronik 42 (1992) Jan./Feb. No. 1, Berlin, DE; Ulrich Pilger "Struktur des DECT–Standards," pp. 23–29.

* cited by examiner

*Primary Examiner*—Ricky Ngo
*Assistant Examiner*—Yvonne Q. Ha
(74) *Attorney, Agent, or Firm*—Bell, Boyd & Lloyd LLC

(57) ABSTRACT

According to the invention, a mobile radio is provided for radio transmission in time-division multiplex frames, where these frames each alternatively have active time slots (Z1) in which data are transmitted, and inactive time slots (Z2) in which no data are transmitted. The time duration of the active time slots is, in this case, twice the duration of the inactive time slots. The mobile radio (1, 2) has a burst mode controller (13) which provides the time-division multiplex frame structure for transmission, and a clock preset device (18), which presets the clock rate for the burst mode controller (13). The clock rate which the clock device (18) presets for the burst mode controller (13) is twice as high during the inactive time slots (Z2) as during the active time slots (Z1).

10 Claims, 3 Drawing Sheets

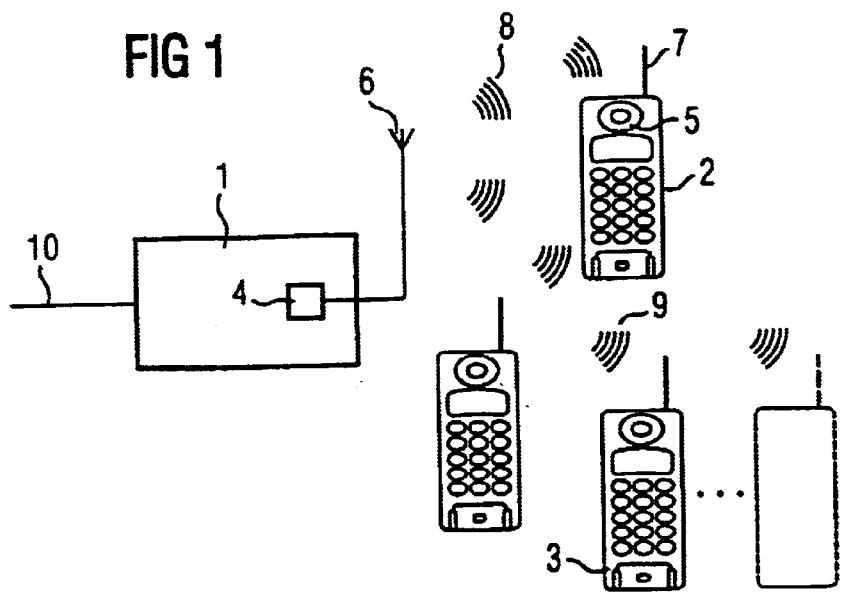
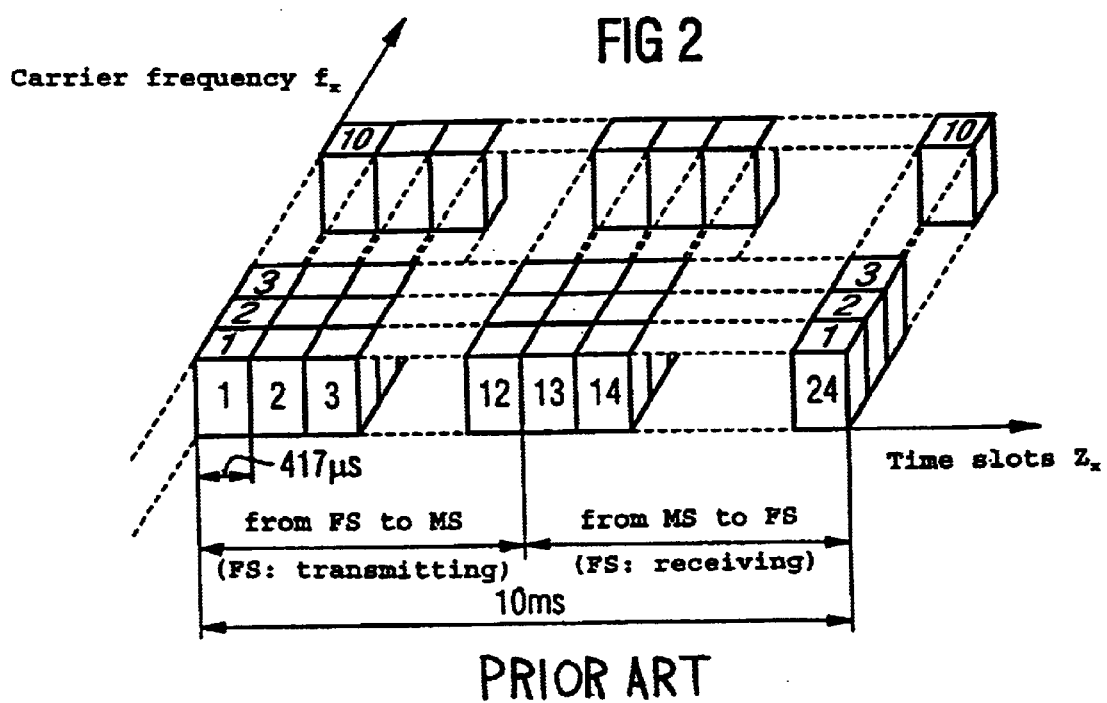
PRIOR ART

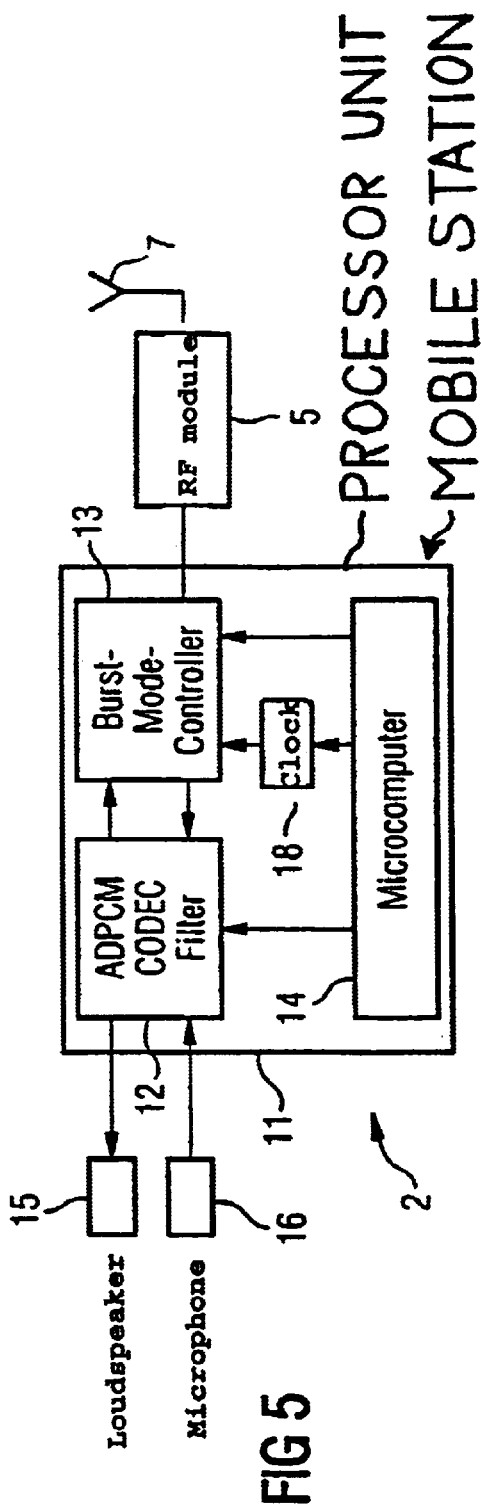
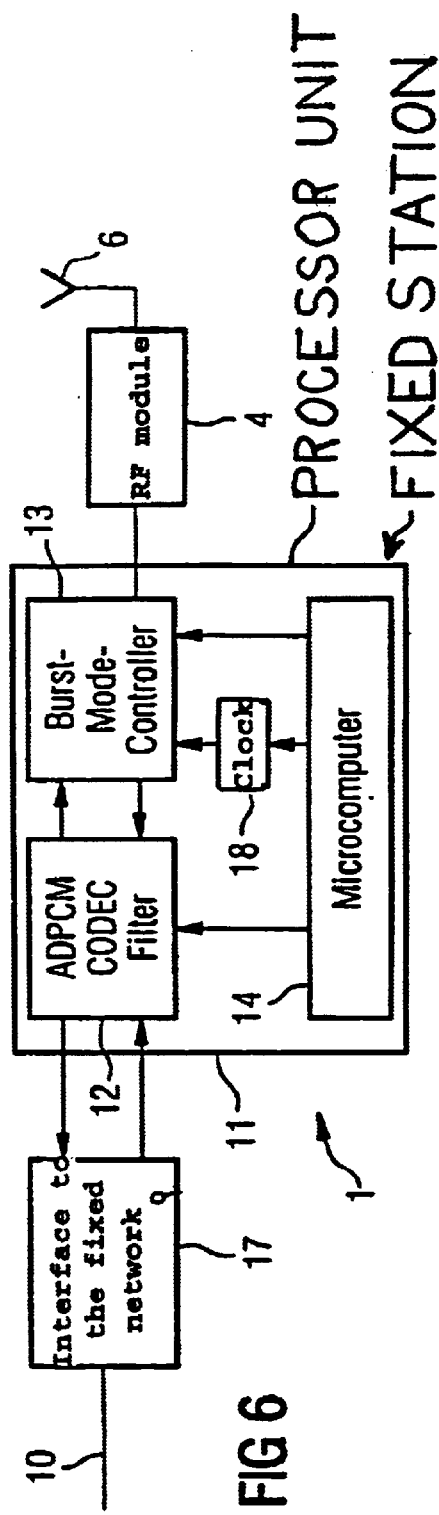

METHOD, MOBILE STATION AND BASE STATION FOR TRANSMITTING SIGNALS

The present invention relates to a method and an arrangement for burst mode control to achieve effective radio transmission of data between a fixed station and at least one mobile station at one of a plurality of carrier frequencies, this data is transmitted in active time slots using a time-division multiplex method (TDMA), these slots each being followed by an inactive time slot.

DESCRIPTION OF THE RELATED ART

The DECT Digital Enhanced Cordless Telecommunication Standard was adopted at the start of the 1990's in order to replace the various existing analogue and digital Standards in Europe. This was the first common European Standard for cordless telecommunications. A DECT network is a microcellular, digital mobile radio network for high subscriber densities. It is primarily designed for use in buildings. However, it is also possible to use the DECT Standard outdoors. The capacity of the DECT network of around 10,000 subscribers per square kilometer provides, from the cordless standard, ideal access technology for network operators. According to the DECT Standard, it is possible to transmit both voice and data signals. Thus, cordless data networks can also be built on a DECT base.

The DECT Standard will be explained in more detail in the following text with reference to FIG. 2. A digital, cordless telecommunications system for ranges of less than 300 m has been standardized for Europe under the designation DECT. In conjunction with the switching function of a telecommunications installation, this system is suitable for mobile telephone and data traffic in an office building or on a commercial site. The DECT functions supplement a telecommunications installation, and thus make it the fixed station FS of the cordless telecommunications system. Digital radio links between the fixed station FS and a maximum of 120 mobile stations MS can be produced, monitored and controlled on up to 120 channels.

A maximum of ten different carrier frequencies (carriers) are used for transmission in the frequency range from 1.88 GHz to 1.9 GHz. This frequency-division multiplex method is called FDMA (Frequency Division Multiple Access).

Twelve channels are transmitted successively in time on each of the ten carrier frequencies using the time-division multiplex method TDMA (Time Division Multiple Access). Cordless telecommunication in accordance with the DECT Standard using ten carrier frequencies with in each case twelve channels per carrier frequency provides a total of 120 channels. Since one channel is required, for example, for each voice link, there are 120 links to the maximum of 120 mobile stations Ms. The duplex method (TDD) is used for on the carriers. Once the base stations has transmitted twelve channels (channels 1–12), it switches to received, and receives twelve channels in the opposite direction (channels 13–24).

A time-division multiplex frame thus comprises 24 channels (see FIG. 2). In this case, channel 1 to channel 12 are transmitted from the fixed station FS to the mobile stations MS, while channel 13 to channel 24 are transmitted in the opposite direction, from the mobile stations MS to the fixed station FS. The frame duration is 10 ms. The duration of a channel (time slot) is 417 $\mu$s. 320 bits of information (for example voice) and 104 bits of control data (synchronization, signalling and error check) as well as 56 bits of so-called guard (protection) field are transmitted in this time. The useful bit rate for a subscriber (channel) results from the 320 bits of information within 10 ms. It is thus 32 kilobits per second.

Integrated modules have been developed to carry out the DECT functions for fixed and mobile stations. In this case, the fixed station and the mobile station carry out similar functions. One of these integrated modules is the RF module, i.e., the module which carries out the actual function of receiving and transmitting the RF band.

It is known for so-called fast hopping RF modules to be used, (RF modules which can carry out a carrier frequency change very quickly, for example from one tome slot or channel to the next). These fast hopping RF modules are intrinsically very complex and costly. Thus, in practice, so-called slow hopping RF modules are mainly used, (RF modules which require a certain amount of time to program the carrier frequency for the next time slot). In practice, the time period which the slow hopping RF module requires to program the carrier frequency corresponds essentially to the time period of a time slot in the DECT Standard. This means that, after each active time slot, (in which data are transmitted), a so-called inactive time slot (blind slot) in which no data can be transmitted, must follow. This means that, in practice, only six links are available on one carrier frequency to the DECT Standard, instead of the twelve possible links.

A DECT channel is defined by its time slot and its carrier frequency. The organization to reuse physical channels is carried out by means of dynamic channel selection. Meaning that there is no need for any complex frequency planning, as in cellular systems. To set up a link, the signal levels of all the channels are measured continuously, and the interference-free channels are controlled in a channel list (channel map). While a link exists, the signal levels of all the channels and the reception quality continue to be monitored. If this monitoring indicates that the channel currently being used has been transmitted at a carrier frequency which was subject to interference (for example, as a result of the influence of a transmission at the same carrier frequency from or to another fixed station), another carrier frequency is automatically selected for the next active time slot, and is entered in the channel list as being interference-free. Alternatively, the carrier frequency change can also be carried out after each frame.

As a further option, a carrier frequency change may always take place after a predetermined time period, such as a time slot or a frame, (designated "frequency hopping spread spectrum".)

In other countries, the transmission conditions and standards may differ. For example, in the USA, the normal DECT band between 1.88 and 1.90 GHz cannot be used for transmission, but the generally accessible 2.4 GHz ISM band (Industrial, Scientific, Medical) is available instead. Furthermore, changes would have to be carried out for matching to the national Standards, such as the American Standard "FCC part 15" (Federal Communications Commission). This American Standard describes the transmission method, transmission powers and available bandwidth allowed for the radio interface.

In the DECT Standard, in addition to the 320 information bits mentioned above, each time slot also contains another 104 bits required for signal transmission, as well as 56 bits in the guard field, so that each time slot contains a total of 480 bits. This results in a data rate of (24×480 bits)/10 ms=)1,152,000 bits/s. A data rate at this level is pointless in the American ISM band, since the bandwidth required per usable channel would be too large.

The problem thus exists of using components which have been developed for the DECT Standard in other transmission conditions as well, for cost reasons, while at the same time making it possible to use the available bandwidth efficiently.

EP-0 767 551 discloses a method for increasing the load and, thus, the capacity of the DECT system, whereby the ISM frequency band in the 2.4 GHz range is used for information transmission in addition to the DECT frequency band between 1.880 and 1.900 GHz, and the FHSS method (Frequency Hopping Spread Spectrum) or the DSSS method (Direct Sequence Spread Spectrum) is also applied.

GB-2 295 930 discloses a TDMA radio system based on the frequency hopping method wherein a frequency change is implemented in the guard period between two time slots. Radio devices of the TDMA radio system respectively comprise two RF modules (synthesizers) for this frequency change in the guard period between two time slots. While the time slot-related transmission of information occurs via one RF module, the respective radio device is set to the next time slot frequency with the other RF module.

SUMMARY OF THE INVENTION

The present invention thus has the object of providing a mobile radio and a method for digital radio transmission of data which allow effective use of the bandwidth of a TDMA system in a simple manner. The method and the arrangement should particularly allow, cost-effective use of slow hopping RF modules.

A main idea of the present invention is in this case to refine the burst mode controller in a mobile radio.

According to the present invention, a mobile radio is provided for radio transmission in time-division multiplex frames. The time-division multiplex frames in each case alternately have active time slots; in which data are transmitted, and inactive time slots; in which no data are transmitted. The time duration of these active time slots is twice the duration of the inactive time slots. The mobile radio according to the present invention has a burst mode controller which presets the structure of the time-division multiplex frames for transmission, as well as a clock preset device, which presets the clock rate for the burst mode controller. The clock rate which the clock preset device presets for this burst mode controller is twice as high during the inactive time slots as during the active time slots.

The clock rate during the inactive time slots can be chosen to be equal to the clock rate in the known DECT Standard. The clock rate during the active time slots is half the DECT clock rate.

The mobile radio can be set to receive/transmit in a 2.4 GHz band.

According to the present invention, a method is also provided for radio transmission between a fixed station and at least one mobile station using time-division multiplex frames, the time-division multiplex frames in each case alternately having active time slots, in which data are transmitted, and inactive time slots, in which no data are transmitted. The time duration of these active time slots is twice the duration of the inactive time slots. A burst mode controller presets the time-division multiplex frames for transmission, and a clock device in turn presets the clock rate for the burst mode controller. According to the invention, the clock device presets a clock rate for the burst mode controller during the inactive time slots which is twice as high as the clock rate during the active time slots.

The clock rate during the inactive time slots may be chosen to be equal to the clock rate in the known DECT Standard.

The transmission can take place in a 2.4 GHz band.

A time frame for transmission may contain four active time slots for transmission from the fixed station to a mobile station, followed by four time slots for transmission from the mobile station to the fixed station.

BRIEF DESCRIPTION OF THE DRAWINGS

The invention will now be explained in more detail using an exemplary embodiment and with reference to the accompanying drawings, in which:

FIG. 1 is a schematic diagram showing an arrangement according to the invention for digital radio transmission of data, FIG. 2 is a schematic diagram showing the known DECT Standard, FIG. 5 is a block diagram showing the internal design of a mobile station according to the present invention, and FIG. 6 is a block diagram showing the internal design of a fixed station according to the present invention.

DESCRIPTION OF THE PREFERRED EMBODIMENTS

Figure 3:
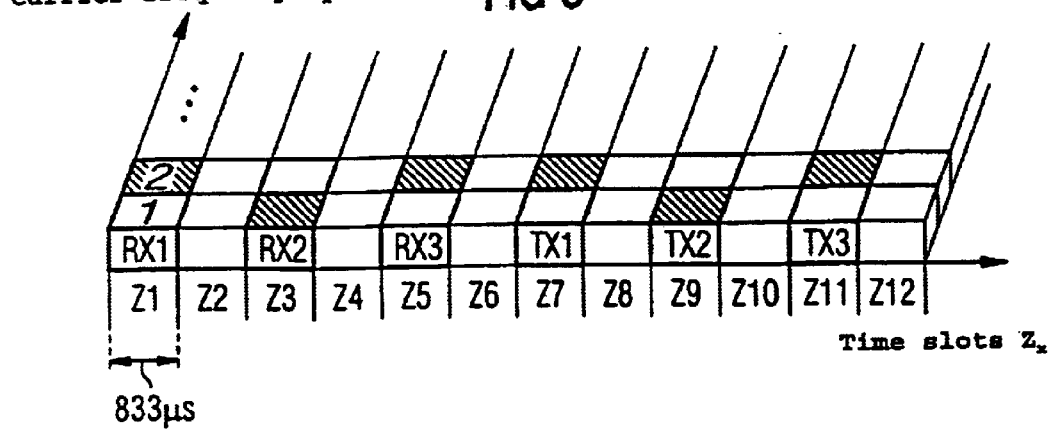
FIG. 3 is a schematic diagram showing the channel allocation for matching the known DECT Standard to the American ISM band.

FIG. 1 shows an arrangement for digital radio transmission of data. A fixed station 1 is in this case connected to the fixed network by means of a terminal line 10. The fixed station 1 has an RF module 4, by which data can be transmitted and received via of an antenna 6. The RF module 4 may be, at least effective) slow hopping RF module, which intrinsically requires a certain period of time to change from one to another carrier frequency. This time period is in the order of magnitude of a time slot, i.e., between about 100 $\mu$s and 1 ms, and, in particular, between about 300 $\mu$s and 500 $\mu$s. This time period required for the carrier frequency change may correspond, for example, to the time period which is filled by a time slot in a time-division multiplex method (TDMA). By way of the antenna 6, a radio transmission may be made via a radio transmission path 8 to a mobile station 2, or a radio transmission may be made to a mobile station (cordless telephone) 3 via a second radio transmission path 9. All the mobile stations illustrated in FIG. 1 are of the same design, so that a more detailed explanation will be given only on the basis of the illustrated mobile station 2.

As can be seen in FIG. 1, this mobile station 2 has an antenna 7 for receiving and for transmitting data from and, respectively, to the fixed station 1. The mobile station 2 contains an RF module 5, which essentially corresponds to the RF module 4 used in the fixed station 1. The RF module 5 of the mobile station 2 may thus also be a slow hopping RF module.

FIG. 2 shows how the known DECT Standard can be matched to the American ISM band. As already mentioned above, if the DECT Standard were retained, the resulting data rate would be too high for the ISM band. As can be seen in FIG. 3, the number of time slots per frame is for this reason halved, only 12 time slots Z1–Z12 are provided in the ten milliseconds of a time frame instead of the 24 time slots (channels) in the DECT Standard, each of the 12 time slots can be used to transmit 480 bits. By halving the number of time slots, the data rate is also halved, in a corresponding manner, to (12×480 bits)/10 ms=576,000 bits/s. This lower data rate results in a bandwidth that is acceptable for the American ISM band.

As can be seen, in FIG. 3, it is necessary to provide slow hopping RF modules in a cost-effective implementation of the equipment required for radio transmission, which means that each active time slot in which data are transmitted must be followed by an inactive time slot (blind slot), in which no data can be transmitted. The programming of the carrier frequency of an RF module for the next time slot is carried out during these inactive time slots. If twelve time slots Z1–Z12 are provided (6 time slots Z1–Z6 for transmission from a mobile station to the fixed station and six time slots Z7–Z12 for transmission from the fixed station to a mobile station), then there is a maximum of only three possible links available. In an implementation using the cost-effective slow hopping RF modules, the usable channel capacity is thus not very great as a result of the regulation by the slow hopping RF module to a maximum of three links.

Possible active time slots are illustrated shaded in FIG. 3. For example, as illustrated, transmission from the fixed station 1 to a mobile station 2, 3 can be made at the carrier frequency $f_2$ in the time slot Z1 (RX1). If this time slot Z1 is followed by a time slot Z2, in which no data transmission takes place (inactive time slot, blind slot), a slow hopping RF module can also use the time duration of the inactive time slot Z2 to change the carrier frequency. As illustrated in FIG. 3, the carrier frequency can be changed, for example, from the carrier frequency $f_2$ to the carrier frequency $f_1$. Thus, as illustrated in FIG. 3, a transmission can be made in the time slot Z3 from the fixed station to a mobile station, at the carrier frequency $f_1$ (RX2). The layout shown in FIG. 3 is thus distinguished by the fact that, with the given time slot distribution, an active time slot (illustrated as shaded) can be operated at each of the predetermined carrier frequencies ($f_1$, $f_2$ . . . ).

According to the DECT Standard, the organization of channel reuse is carried out by way of dynamic channel selection, a channel being defined by its carrier frequency and its time slot. There is thus no need for any complex frequency planning, as in cellular systems. To set up links, the signal levels of all the channels are measured continuously, and the interference-free channels are controlled in a channel list (channel map). During a link, the signal levels of all the channels of all the possible carrier frequencies, and the reception quality, continue to be monitored.

Thus, as illustrated in FIG. 3, if it is found in the time slot Z1 when transmitting (RX1) at the carrier frequency $f_2$ that the reception or transmission conditions are better at the carrier frequency $f_1$, then it is possible to change, during the time duration of the time slot Z2 in which no data transmission is taking place, to the carrier frequency 1 which has been identified as being better. The transmission RX2 takes place during the time slot Z3 at the carrier frequency $f_2$ which has been found to be better.

As a further option, a carrier frequency change can always take place after a predetermined time duration, such as a time slot or a frame, and this is called "frequency hopping spread spectrum". There is no channel planning for such a transmission method. It is accepted that the transmission will take place subject to interference during one time slot or one frame, since the continuous carrier frequency changes ensure that the interference never lasts very long.

As already stated, the channel allocation scheme illustrated in FIG. 3 has the disadvantage that, since the number of time slots per time frame is halved to 12, as a result of which the duration of a time slot is doubled to 833 µs, and as a result of the necessity for the inactive time slots after each active time slot, this results in only three possible links (three links from a fixed station to a mobile station and three links from a mobile station to a fixed station) being available, in contrast to the six possible links according to the DECT Standard.

Figure 4:
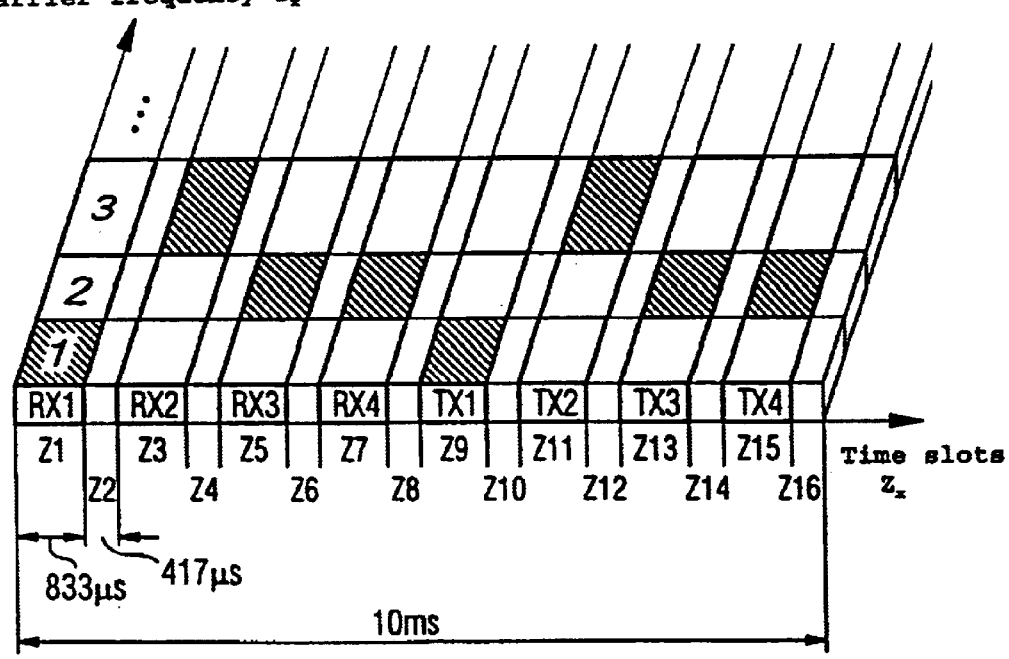
FIG. 4 is a schematic diagram showing a particularly effective allocation of the channels of the DECT Standard matched to the ISM band, according to the invention.

FIG. 4 illustrates a time slot structure which allows the maximum possible number of links to be increased from three to four without there being any negative effect on the flexible selection of the carrier frequencies from one active time slot to the next active time slots. As can be seen in FIG. 4, this increase in the maximum number of links from three to four is essentially achieved by the time duration of an inactive time slot, during which no data transmission takes place, being shortened in comparison with the time duration of an active time slot. As is shown in FIG. 4, the time duration of an active time slot Z1, Z3, Z5, Z7, Z9, Z11, Z13 and Z15 in a time frame is in each case 833 µs, if the time frame lasts for 10 ms overall. The time duration of the inactive time slots Z2, Z4, Z6, Z8, Z10, Z12, Z14 and Z16 is only 417 µs, as illustrated in FIG. 4, and is thus essentially only half the time duration of the active time slots. A slow hopping RF module known from DECT technology requires a time period of at least 417 µs after an active time slot, in order to carry out frequency programming for the carrier frequency of the next time slot. Half a time slot of the DECT Standard matched to the ISM band, with a time duration of 833 µs/2=417 µs, it thus sufficient for an inactive time slot (blind slot).

As can be seen in FIG. 4, a data transmission RX1, for example, can be made during the time slot Z1 from the fixed station to a mobile station at a carrier frequency $f_1$. The order to allow the transmission to be made with a low bandwidth as well, the time duration of the time slot Z1 is in this case twice the time duration according to the DECT Standard, namely 833 µs. The time slot Z1 is followed by an non-active time slot Z2, whose time duration is only 417 µs. This time period of 417 µs is intrinsically sufficient for an RF module using the slow hopping technique to program the carrier frequency for the next active time slot Z3.

After eight time slots Z1 to Z8, which correspond to half the time slots Z1 to Z16 in a time frame of 10 ms, the mobile station or stations transmit to the fixed station using the duplex method (TTD). For example, a mobile station can transmit (TX1) to the fixed station at a carrier frequency $f_1$ during the time slot Z9. The inactive time slot Z10 following the active time slot Z9 once again lasts for only half the time duration of the active time slot Z9 (833 µs), namely 417 µs. The time duration of the inactive half time slot Z10 is in turn sufficient for the RF module to carry out the frequency programming for the next active time slot Z11, for further transmission from a mobile station to the fixed station (TX2).

FIG. 5 illustrates the internal design of a mobile station 2. As illustrated, the essential elements of the mobile station are the input/output unit for voice data, in the form of a loudspeaker 15 and a microphone 16, a processor unit, which is generally designated 11, and an RF module 5 as well as an antenna 7. The processor unit 11 contains a coding/decoding unit 12, a burst mode controller 13 and a microcomputer 14. In this case, analogue voice data are passed from the microphone 16 to the coding/decoding unit 12. Analogue/digital conversion is carried out in the coding/decoding unit 12. The conversion, for example at a bit rate of 32 kilobits per second, provides sufficiently accurate voice quality.

The output signal of the coding/decoding unit 12 is passed to the burst mode controller 13. The burst mode controller 13 carries out procedures for encryption, scrambling and error correction and thus makes a major improvement to the security of the radio traffic against eavesdropping. The burst mode controller 13 is thus responsible for the functions of the physical DECT layer, such as setting up and decoding the time slot (burst) signal, separating control and data channels, time slot allocation and synchronization. The output signal of the burst mode controller 13 is passed to the RF module 5, in order to be transmitted via the antenna 7.

For the situation in which data are received via the antenna 7 and the RF module 5, the burst mode controller 13 converts the amplified, filtered signal, modulated down to baseband, using a data burst at, for example, 1.152 megabits/s back into digital voice data at, for example, 32 kilobits/s. The control information is separated at the same time and is processed in the control section. The coding/decoding unit 12 then decodes the output signals of the burst mode controller 13. After the subsequent D/A conversion, the reconstructed audio signal is available at the loudspeaker 15.

The coding/decoding unit 12 as well as the burst mode controller 13 are driven, as illustrated, by a microcomputer 14. A clock preset device 18 presets the clock rate for the burst mode controller 13. The clock preset device 18 is in this case driven by the burst mode controller 13 in accordance with the active and inactive time slots, as is illustrated by an arrow in FIGS. 5 and 6.

The clock rate which the clock preset device 18 presets has only half the number of time slots in the active full time slots Z1, Z3, Z5, etc, as the DECT Standard, i.e., if there are only 12 time slots in the 10 ms of a time frame instead of the 24 time slots in the DECT Standard, the clock rate is only half as high as the clock rate in the original DECT Standard. According to the invention, the burst mode controller 13 itself presets the clock preset device 18 in terms of whether a given time slots is active or inactive. The clock preset device 18 in turn drives the burst mode controller 13 during the inactive half time slots Z2, Z4, Z6, etc., with a clock rate which is double the clock rate which the clock preset device 18 outputs to the burst mode controller 13 during the active full time slots. The clock rate which the clock preset device 18 outputs to the burst mode controller 13 during an inactive half time slot thus corresponds exactly to the clock rate as is used in the original DECT Standard.

Since, during the inactive time slots, the clock rate of the clock preset device 18 for the burst mode controller 13 is admittedly twice as high as the clock rate during the active time slots, but corresponds exactly to the clock rate according to the original DECT Standard, there are also no problems, in particular, with respect to the drive for the RF module 5, since this RF module 5 receives a maximum clock rate which corresponds exactly to the normal DECT Standard clock rate used. Thus, there is no need for any design changes to be carried out in the RF module in comparison with the DECT Standard, as a result of which components developed for the DECT Standard can continue to be used, virtually unmodified, in a cost-effective manner.

The burst mode controller 13 thus switches the clock preset device 18 between the clock rate for the active time slots and the clock rate, which is twice as high, for the inactive time slots. As a result of the clock rate during the inactive time slots, which is twice as high, the time duration of an inactive time slot is half that of an active time slot.

In other respects, it is evident that, in general, as a result of a clock rate in the inactive time slots which is n-times the clock rate in the active time slots, the time duration of the inactive time slots can be set to 1/n-times that of the active time slots.

Since that only the clock rate of the burst mode controller 13 is changed, no design changes need be carried out on the burst mode controller itself.

The clock preset device 18 can, of course, also be integrated in the burst mode controller 13.

FIG. 6 shows the internal design of a fixed station according to the invention. As can be seen by comparing FIG. 5 and FIG. 6, the fixed station and mobile station are constructed essentially symmetrically. Thus, for the purposes of the present description, the term mobile radio is intended to mean either a mobile station or a fixed station. The fixed station shown in FIG. 6 differs from the mobile station shown in FIG. 5 only in that the loudspeaker 15 and the microphone 16 are connected to the terminal line 10 through an interface 17.

The clock rate control of the burst mode controller, according to the invention, thus enables, in a particularly advantageous manner, the time slot structure comprising active time slots and inactive time slots which, in comparison with them, are shortened to 1/n of the time duration of the active time slots. A particularly efficiently used time frame structure can thus be achieved in a simple manner.

The above-described method and apparatus are illustrative of the principles of the present invention. Numerous modifications and adaptions thereof will be readily apparent to those skilled in this art without departing from the spirit and scope of the present invention.

What is claimed is:

1. A mobile radio for radio transmission upon utilization of time-successively different carrier frequencies according to time-division multiplex frames comprising:
   a burst mode controller, which provides said time-division multiplex frame structure for transmission, said time-division multiplex frams each comprising active time slots in which data are transmitted, and inactive time slots in which not data are transmitted, wherein said active time slots have twice the time duration of said inactive time slots; and
   a clock preset device which presets a clock a rate for said burst mode controller, wherein the time duration of a clock influencing the time slots that said clock preset device presets for said burst mode controller is chosen to be twice as high during said inactive time slots than during said active time slots, and wherein a setting of a carrier frequency ensues during said inactive time slots.

2. A mobile radio according to claim 1, wherein said clock rate during said inactive time slots is chosen to be equal to the clock rate in the DECT Standard.

3. A mobile radio according to claim 1, wherein said mobile radio is set to receive or transmit in a 2.4 GHz band.

4. A mobile radio according to claim 1, wherein a time frame for transmission comprises four active time slots for transmission from a fixed station to a mobile station, and four active time slots for transmission from said mobile station to said fixed station.

5. A mobile radio according to claim 1, wherein said burst mode controller is designed such that it switches said clock preset device between said clock rate during said active time slots and a clock rate, which is twice as high, during said inactive time slots.

6. A method for radio transmission between a fixed station and a mobile station in time-division multiplex frames, comprising the steps of:

transmitting data in active time slots of a time-division multiplex frame and not transmitting data in inactive time slots of a time division multiplex frame, wherein said active slots and said inactive slots alternate within said time-division multiplex frames, and wherein said active time slots are twice the time duration of said inactive slots;

converting said time-division multiplex frame structure of said transmission, by a burst mode controller, said controller being supplied with a clock;

presetting by a clock preset device, a clock rate for said burst mode controller during said inactive time slots which is twice as high as the clock rate during said active time slots.

7. A method according to claim 6, wherein said clock rate during said inactive time slots is chosen to be equal to the clock rate in the DECT Standard.

8. A method according to claim 6 wherein said transmission takes place in a 2.4 GHz band.

9. A method according to claim 6, further comprising the steps of:

transmitting from said fixed station to said mobile station, using four active time slots of a time frame; and transmitting for from said mobile station to said fixed station in four additional active time slots of a time frame.

10. A method according to claim 6, further comprising the step of:

switching said clock preset device, by said burst mode controller, between said clock rate during said active time slots and said clock rate, which is twice as high, during said inactive time slots.

* * * * *